United States Patent [19]

Henderson et al.

[11] 4,327,192
[45] Apr. 27, 1982

[54] METHOD OF FABRICATING NESTED SHELLS AND RESULTING PRODUCT

[75] Inventors: Timothy M. Henderson; Lawrence B. Kool, both of Ann Arbor, Mich.

[73] Assignee: The United States of America as represented by the United States Department of Energy, Washington, D.C.

[21] Appl. No.: 194,134

[22] Filed: Oct. 6, 1980

[51] Int. Cl.³ .............................................. C08J 9/16
[52] U.S. Cl. ...................................... 521/56; 521/53; 521/57; 523/218; 523/219; 523/214; 523/216; 523/210
[58] Field of Search ............................. 521/56, 53, 57

[56] References Cited

U.S. PATENT DOCUMENTS

| | | | |
|---|---|---|---|
| 3,359,130 | 12/1967 | Goldman | 521/139 |
| 3,615,972 | 10/1971 | Morehouse, Jr. | 521/56 |
| 4,017,290 | 4/1977 | Burdick et al. | 65/21 |
| 4,021,253 | 5/1977 | Burdick et al. | 106/53 |
| 4,154,868 | 5/1979 | Woerner | 427/6 |

*Primary Examiner*—Morton Foelak
*Attorney, Agent, or Firm*—Barnes, Kisselle, Raisch & Choate

[57] ABSTRACT

A multiple shell structure and a method of manufacturing such structure wherein a hollow glass microsphere is surface treated in an organosilane solution so as to render the shell outer surface hydrophobic. The surface treated glass shell is then suspended in the oil phase of an oil-aqueous phase dispersion. The oil phase includes an organic film-forming monomer, a polymerization initiator and a blowing agent. A polymeric film forms at each phase boundary of the dispersion and is then expanded in a blowing operation so as to form an outer homogeneously integral monocellular substantially spherical thermoplastic shell encapsulating an inner glass shell of lesser diameter.

6 Claims, 3 Drawing Figures

METHOD OF FABRICATING NESTED SHELLS AND RESULTING PRODUCT

The present invention is directed to a multiple shell structure of a type wherein an inner shell is encapsulated or nested within an outer shell, and to methods of fabricating the same. More specifically, the invention is directed to a method of encapsulating a hollow glass microsphere within a polymeric shell such that the glass microsphere "floats" within the polymeric shell, and to the resulting product.

BACKGROUND OF THE INVENTION

Multiple shell structures for use as laser fusion targets have been proposed previously. FIGS. 4 and 5 of Woerner U.S. Pat. No. 4,154,868, for example, show multiple shell targets wherein an inner glass shell is supported (by means not shown) concentrically within an outer glass shell, with the region between the shells being evacuated. It has been proposed that the required structure for supporting the inner shell (not shown in the Woerner patent) may comprise a fiber extending between the inner surface of the outer shell through the intervening space to the outer surface of the inner shell.

A second type of multiple shell target which has been proposed is one wherein the inner shell is nested within but unsupported by the outer shell. This type of structure, to which the present invention is directed, is one wherein the inner shell may be said to "float" with respect to the outer shell. As used in the present application, the term "float" is not limited to a connotation of buoyancy with respect to the outer shell, but is intended in the broader sense to mean that the inner shell is unsupported by—i.e. is not structurally rigidly coupled to—the outer shell. If the inner shell is more dense than the material in the region between the shell walls, which may be gaseous for example, or if the intrashell is evacuated, the inner shell would normally rest by force of gravity on the lowermost portion of the surrounding outer shell.

One method previously proposed for forming the nested shells involves formation of the outer shell as two hemishells and assembly of the hemishells with the inner shell contained therein. The material inhomogeneity at the resulting seam in the outer shell is undesirable for ICF targets. Another method, termed the soluble or disposable mandrel technique, involves encapsulation of the inner shell in a soluble material, followed by formation of the outer shell around the encapsulant. An opening is then formed in the outer shell and the encapsulant is dissolved away. The hole in the outer shell, which must then be plugged, results in a small but appreciable non-uniformity in the outer shell wall. An additional problem is the expense that would be involved in application of either technique to production of nested shells in quantity.

OBJECTS AND SUMMARY OF THE INVENTION

An object of the present invention is to provide a nested shell of the type previously described, and a method of fabricating the same, in which the outer shell is homogeneously integral—i.e. contains no wall non-uniformities or discontinuities such as plugs or seams. A further and more specific object of the invention is to provide a method of encapsulating a hollow glass microsphere within a homogeneously integral shell of polymeric material, and the resulting product.

In accordance with the invention, one or more precursor shells are first treated to render the shell outer surfaces hydrophobic. The surface-treated shells are then suspended in an aqueous phase dispersion having an oil phase which contains an organic monomer suitable for film-forming polymerization to a thermoplastic resinous shell, and a liquid blowing agent in which the monomer is substantially insoluble and which is volatile above the softening temperature of the thermoplastic shell. The phase dispersion also contains an aqueous dispersion stabilizing material to maintain the dispersion during the polymerization process. Due to the hydrophobic surface treatment, the precursor shells migrate to and are suspended within the oil phase droplets. The dispersion is then subjected to conditions to induce polymerization of the monomer so as to form at the oil-aqueous phase dispersion boundaries hollow polymeric particles encapsulating the blowing agent and suspended precursor shells. The polymeric particles are then expanded in a blowing operation to form final multiple shell structures each comprising an outer polymeric shell and an inner precursor shell nested therewithin.

By way of background, reference is made to the U.S. patent to Morehouse et al., U.S. Pat. No. 3,615,972, the disclosure of which is incorporated herein. Morehouse et al describes a process for in situ formation of spheroidal polymeric particles containing a blowing agent in an oil-aqueous phase dispersion, followed by expansion of the particles in a blowing operation to form a hollow gas-filled monocellular homogeneously integral thermoplastic microshell.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
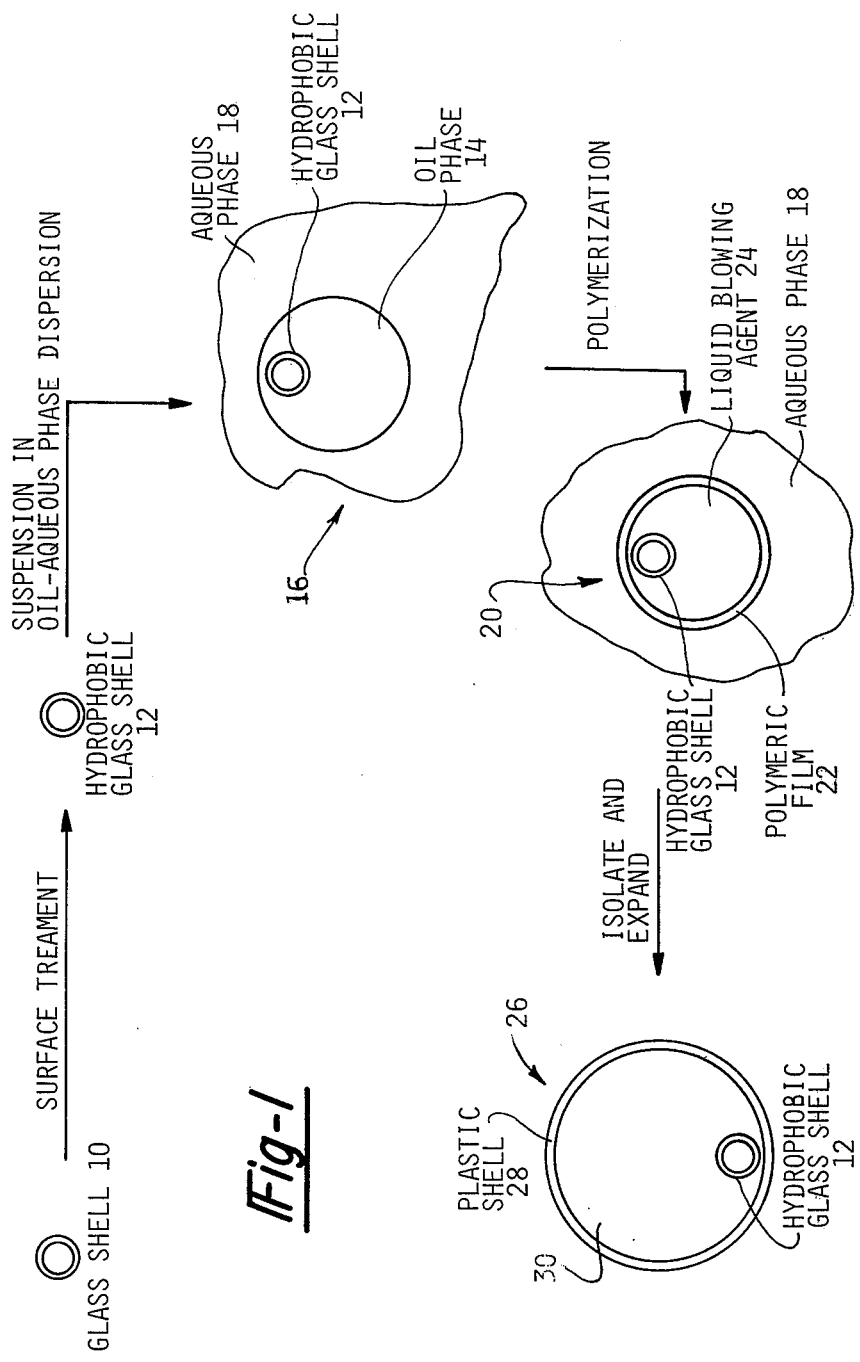
FIG. 1 is a schematic diagram of one exemplary method of in situ shell microencapsulation in accordance with the invention.

FIG. 1 illustrates a working exemplary embodiment of the method in accordance with the invention for encapsulation of glass shells within outer shells of polymeric construction. Referring to FIG. 1, a hollow glass precursor microsphere or shell 10 is first formed by suitable methods such as those disclosed in the U.S. Pat. Nos. to Burdick et al 4,017,290 and 4,021,253, or obtained from a suitable vendor such as Emerson and Cummings. The shells 10 are heated under reflux conditions in a 2% hexane solution of dichlorodimethylsilane for twenty-four hours. The treated shells 12 are then washed, floated in hexane to remove excess silane and isolated on a fine sieve. The isolated shells 12 are air dried. Surface treatment of the glass shells in an organosilane renders the shell outer surface hydrophobic. Where the final product is to be used as an ICF target, the glass shell may be diffusion-filled with fusion fuel (isotopes of hydrogen) prior to or following the surface treatment operation.

The surface treated shells 12 are then suspended in the oil phase 14 of an oil phase-aqueous phase dispersion 16. The oil phase 14 contains the film-forming organic monomer, the liquid blowing agent and, if required, a polymerization initiator. The aqueous phase 18 includes dispersion stabilizing material as previously described. Upon agitation, the glass shells 12 become suspended with the colloidal oil phase droplets shown schematically in FIG. 1 and in FIG. 2 due to the hydrophobic nature of the shell outer surfaces.

Figure 2:
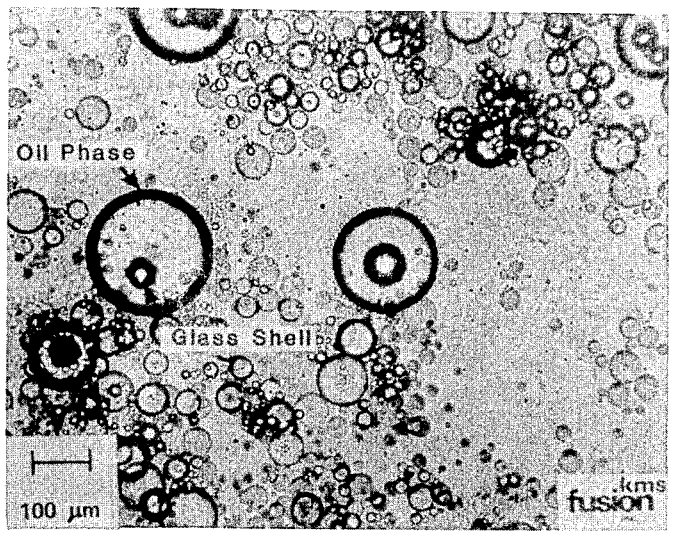
FIG. 2 is a photomicrograph of shells in accordance with the invention at an intermediate stage of fabrication.

In the previously-mentioned working example of the invention, the aqueous phase 18 consists of 300 ml distilled water mixed with 1 g LUDOX HS colloidal silica (DuPont), 3 g 5% aqueous HYONIC LA-90 sulfactant (Diamond Shamrock) and 1 g 2.5% sodium dichromate. The solution is pH-adjusted to 4.0 with dilute HCl. The organic or oil phase consists of 100 g distilled methyl methacrylate (MMA), 35 g 2,2 dimethyl butane and 1.5 g VAZO 33 W polymerization initiator (DuPont). A small spatula tip full of surface-treated hydrophobic shells 12 is added to 2 ml of organic phase in an 8 ml vial and thoroughly wet. Aqueous phase is then added until the vial is three-quarters full. The vial is shaken by hand until a stable emulsion is formed. FIG. 2 is a photomicrograph showing the treated glass shells suspended with the oil phase droplets of the phase dispersion at this intermediate stage of fabrication.

The phase dispersion 16 (FIG. 1) with suspended glass shells 12 is then subjected to conditions for inducing polymerization so as to form the hollow particles 20 each comprising a polymeric film 22 at the oil-aqueous phase boundary. The glass shell 12 and liquid blowing agent 24 are encapsulated within the film 22. In the working example described herein, polymerization is accomplished by placing the vial in a constant temperature 35° C. bath for twelve hours.

Figure 3:
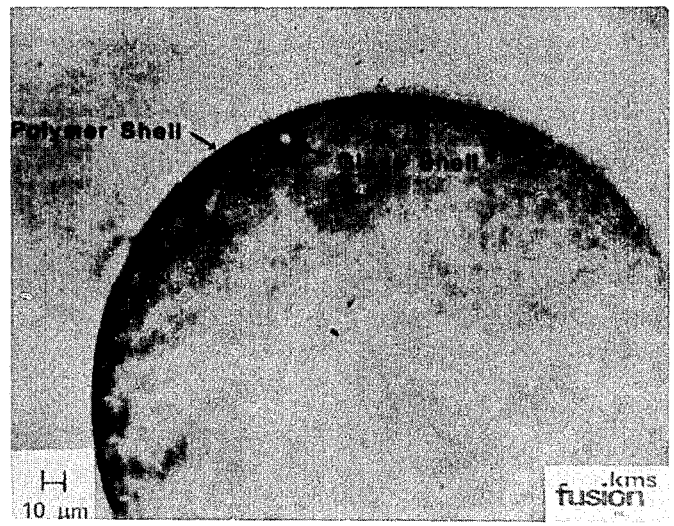
FIG. 3 is a photomicrograph of shells fabricated in accordance with the exemplary method of the invention illustrated in FIG. 1.

The particles are then isolated by suction filtration, washed in water and expanded by heating for fifteen minutes at 80° to 110° C. so as to volatilize the blowing agent and form the product 26 comprising the glass shell 12 floating within the thermoplastic shell 28. The internal volume 30 of shell 28 between the opposing surfaces of shells 28, 12 is filled with gaseous (or liquid) residue of the polymerization and blowing operations. Examination of the resulting structure in FIG. 3 shows that the glass shell has been encapsulated within a monocellular and homogeneously integral polymeric shell. Hydrophobic surface pretreatment of the precursor shell 10 insures that the glass shell 12 in the final product floats freely within the polymeric shell 28 rather than being encapsulated within the shell wall.

Although the invention has been described in detail in connection with a particular working example thereof, it will be evident that the invention in its broadest aspects is not so limited. For example, inner shells 12 of glass composition, particularly borosilicate glass, are particularly desirable for ICF target applications because of high permeability to hydrogen isotopes at moderately elevated temperatures and high retention at normal polymerization and blowing temperatures. However, the invention also contemplates that precursor shells of metal or thermoplastic construction may be utilized to advantage in ICF and other applications, and may be encapsulated within outer polymeric shells in accordance with the method of the invention in its broadest aspects. Similarly, although use of a particular monomer (MMA) has been described, other film-forming monomers are contemplated. See the above-referenced Morehouse et al patent.

What is claimed is:

1. A method of in situ microencapsulation of hollow nested shells of the type which comprise an inner shell floating within a surrounding outer shell, said method comprising the steps:
   (a) surface treating a precursor shell so as to render the outer surface of said precursor shell hydrophobic,
   (b) suspending the surface-treated precursor shell within the oil phase of an oil-aqueous phase dispersion, with said oil phase including an organic film-forming monomer and a liquid blowing agent, and
   (c) initiating polymerization within said oil phase such that particles are formed comprising a polymeric film at the oil-aqueous phase boundary of said dispersion encapsulating said surface-treated precursor shell, and
   (d) heating the polymeric particle formed in said step (c) to a temperature sufficient to cause volatilization of the liquid blowing agent thereby expanding said particle to form a homogeneously integral monocellular substantially spherical polymeric shell having said precursor shell encapsulated therewithin.

2. The method set forth in claim 1 wherein said precursor shell is of glass material composition, and wherein said step (a) comprises the step of suspending said inner shell in an organosilane solution.

3. The method set forth in claim 2 wherein said monomer comprises methyl methacrylate.

4. The method set forth in claim 1, 2 or 3 wherein said precursor shell is of material composition selected from the group consisting of glass, metal and thermoplastics.

5. A nested shell structure manufactured in accordance with the method set forth in claim 1, 2 or 3.

6. A multiple shell structure comprising a homogeneously integral monocellular substantially spherical hollow outer shell of thermoplastic polymeric construction, and an inner shell of substantially spherical hollow glass construction with hydrophobic surface pre-treatment encapsulated and floating within said outer shell.

* * * * *